J. T. BREEN.
SPRING WHEEL.
APPLICATION FILED DEC. 7, 1915. RENEWED NOV. 27, 1916.

1,228,744.

Patented June 5, 1917.
2 SHEETS—SHEET 1.

Witnesses
J. W. Michael Jr.
M. Q. Westcott.

Inventor
John T. Breen
By Edson Bros.
Attorney

J. T. BREEN.
SPRING WHEEL.
APPLICATION FILED DEC. 7, 1915. RENEWED NOV. 27, 1916.
1,228,744.
Patented June 5, 1917.
2 SHEETS—SHEET 2.
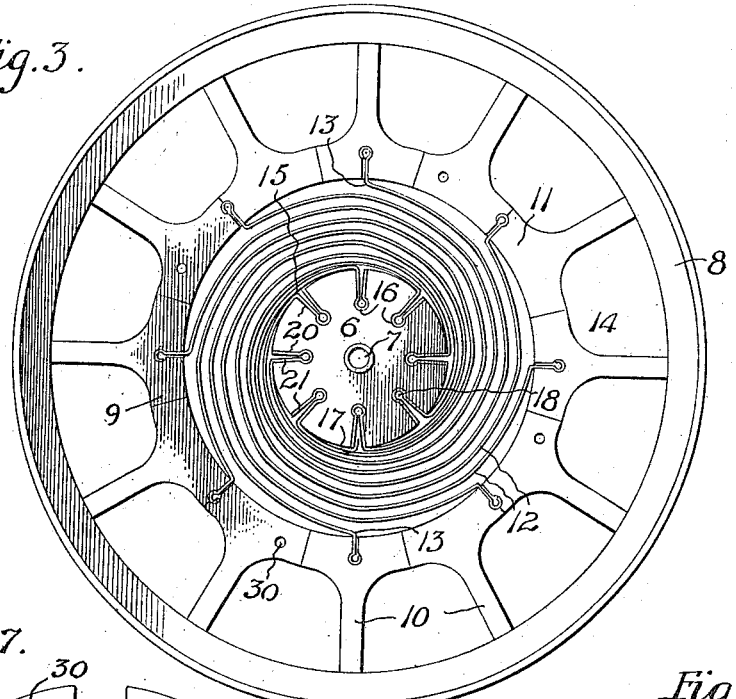
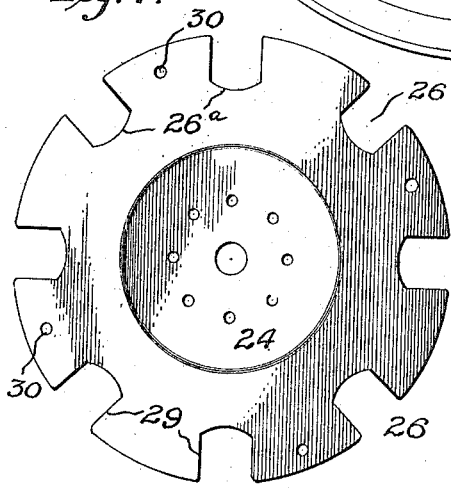
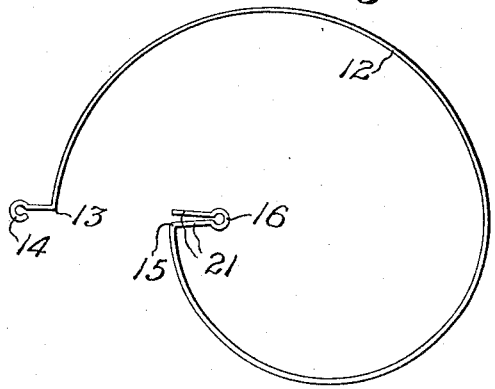
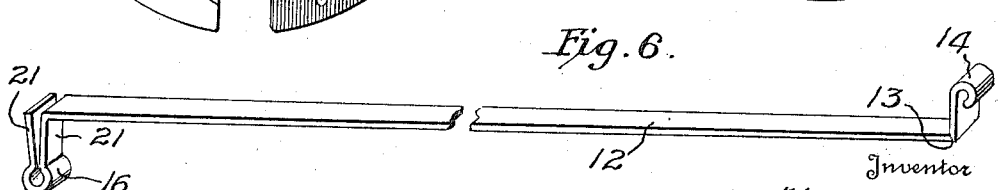
Witnesses
J. W. Michael, Jr.
M. G. Westcott.
Inventor
John T. Breen
By Edson Bros.
Attorney

UNITED STATES PATENT OFFICE.

JOHN T. BREEN, OF HURON, SOUTH DAKOTA.

SPRING-WHEEL.

1,228,744.  Specification of Letters Patent.  Patented June 5, 1917.

Application filed December 7, 1915, Serial No. 65,547. Renewed November 27, 1916. Serial No. 133,816.

*To all whom it may concern:*

Be it known that I, JOHN T. BREEN, a citizen of the United States, residing at Huron, in the county of Beadle and State of South Dakota, have invented certain new and useful Improvements in Spring-Wheels; and I do hereby declare the following to be a full, clear, and exact description of the invention, such as will enable others skilled in the art to which it appertains to make and use the same.

This invention is a wheel and relates more particularly to spring wheels for use in connection with motor vehicles and the like, wherein the inner hub or axle supporting member is suspended in concentric relation to the outer periphery of the wheel by means of a plurality of spring members capable of absorbing the shocks encountered during the travel of the vehicle, thereby rendering it possible to construct said wheel with a rigid and durable tread in preference to the more expensive pneumatic tires now in common use.

Heretofore, in spring wheels of this type wherein the hub is resiliently supported, great difficulty has been encountered in distributing the weight placed on the wheel equally among all of the spring members contained within said wheel. In other words, it has been found that when the axle supporting member or spring supported hub is depressed in a vertical line with relation to the other elements of the wheel by the weight of the vehicle, only those springs which are vertically beneath the axle supporting member offer any resistance to its downward movement, or at any rate, exert by far the greatest resistance, in consequence of which each spring is separately subjected to an enormous strain each time the wheel makes a complete revolution. This tends to gradually weaken the springs and to render them either totally or partially incapable of performing their functions, thereby necessitating the installation of a new series of springs which is always accompanied by an expenditure of time and money. These objections appear to apply to all wheels wherein the springs adapted to support the hub are arranged to extend radially therefrom at an angle to the radii of the said wheel.

In view of the above, the primary object of this invention is to so construct, arrange and position a series of resilient members within a wheel of the character described that the hub thereof will be totally supported thereby and in such manner that any movement of said hub relative to the other elements of said wheel will be communicated directly to said resilient elements, each to receive an equal amount of the strain caused thereby.

Another object of the invention lies in the arrangement of the resilient elements, whereby a portion of each of said elements is vertically beneath the hub supported thereby, in whatever position the wheel may be.

Still another object of the present invention is to construct a wheel of the type described which shall be simple in operation, durable, comparatively inexpensive and which may be quickly and easily assembled.

With these and other objects in view, which will become apparent from the following description taken in connection with the accompanying drawings, this invention consists of a wheel comprising a felly, a hub or axle supporting member, a spoke carrying rim positioned intermediate said hub and said felly, and a plurality of flat spring members interposed between said spoke carrying rim and said hub adapted to resiliently support the latter, each of said flat spring members being connected to said spoke carrying rim and extending in a circuitous path completely around said hub and attached thereto at a point substantially opposite said first mentioned point of attachment, said spring members being protected from contact with foreign substances by means of a plurality of plates of novel construction, one of said plates being provided with means for preventing the movements of said hub exceeding a predetermined limit.

In the drawings I have illustrated the preferred embodiment of my invention but it will be readily understood that the same is susceptible to many modifications and alterations and the right is reserved to make such changes as fairly fall within the scope of the appended claims.

In the drawings:—

Fig. 3 is a front elevation of a wheel with both of the retaining plates removed.

Fig. 5 is a detail view of one of the flat spring members as the same would appear when attached to a wheel.

Fig. 6 is another detail view showing one of the flat spring members in its normal position.

Fig. 7 is a detail view of one of the retaining plates.

Figure 1:
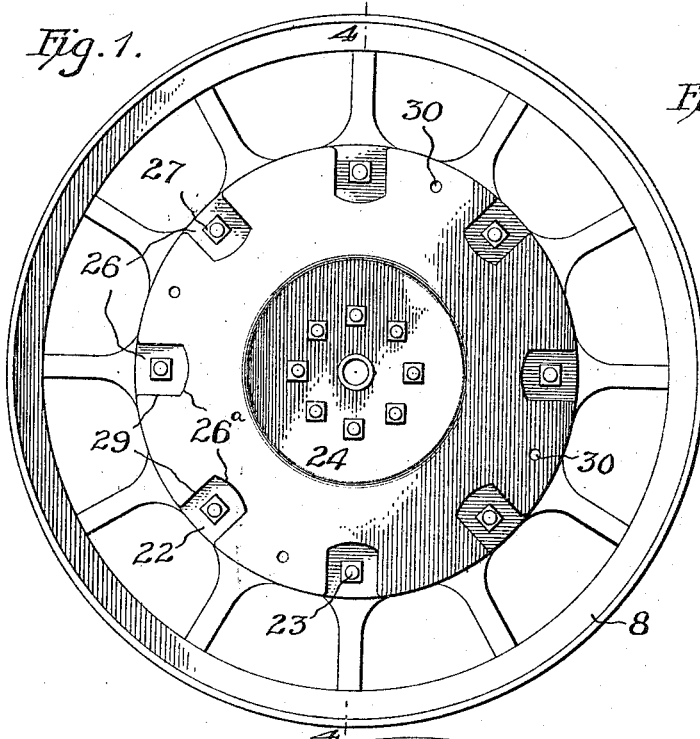
Figure 1 is a front elevation of a wheel embodying my improvements.
Figure 4:
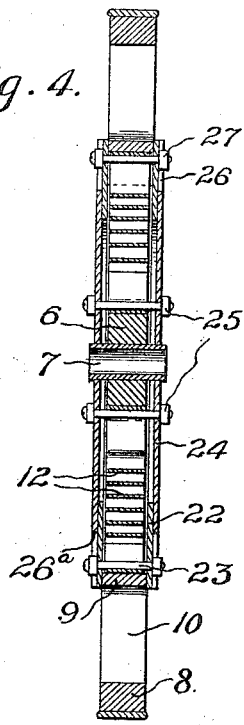
Fig. 4 is a vertical sectional view taken on the line 4—4 of Fig. 1.

In the drawings, like characters of reference are used to designate corresponding parts of the several figures, wherein the wheel is shown comprising a spring supported hub 6 provided with a centrally disposed aperture 7 through which an axle or other member (not shown) is adapted to extend. The tread member or the outer periphery of the wheel is shown at 8. Intermediate the spring supported hub 6 and the outer periphery 8 of said wheel, there is shown positioned a spoke carrying rim 9, said rim 9 being rigidly connected with the outer periphery 8 by means of a plurality of spokes 10. By reference to Fig. 3 of the drawings, it will be noted that the rim 9 is preferably formed by the abutting, one against the other, of the enlarged wedge shaped members 11, provided at the inner end of each of said spokes, said enlarged wedge shaped members being preferably formed integral with said spokes. It will be readily seen from the foregoing that the rim 9 formed in the manner described will be rigid and substantially immovable with relation to the outer periphery 8 of the wheel.

As will be noted from the drawings, the hub member 6 is supported entirely by means of a plurality of flat spring members 12 which are connected to the spoke carrying rim 9 and extend therefrom in a circuitous path to said hub 6. Novel means of attachment of the said spring members 12 to the rim 9 and also to the hub 6, are shown. The ends of said spring members which are adapted to be attached to the rim 9 are shown as bent at substantially right angles at 13, the extreme ends of said flat spring members being curled upon themselves as shown at 14. The portions of the flat spring members 12 from the right angular bend 13 to the ends thereof, including the curled portions 14 are then embedded or anchored in the spoke carrying rim 9, substantially as shown in Fig. 3 of the drawings. It will be noted from the drawings that half of the spring members are attached to the rim 9 by clamping the same between the enlarged wedge shaped portions 11 of the spoke carrying rim 9, while the other half of said flat spring members are shown attached to said rim 9 intermediate the abutting edges of said enlarged wedge shaped members 11. It will be readily understood, however, that in the event it should be desired, all of the flat spring members 12 could be attached to the spoke carrying rim 9 by clamping the ends thereof between the abutting edges of the wedge shaped portions 11. The attachments of the spring members 12 to the hub 6 are somewhat similar to the attachments to the rim 9, as evidenced by the fact that the inner ends thereof are shown as bent at substantially right angles at 15, the ends being thereafter looped upon themselves as shown at 16, and embedded in suitable slots 17 having enlarged portions 18. The inner ends of the looped portions of the flat spring members 12 are enlarged to substantially cylindrical form, said enlarged cylindrical portions being seated within enlarged portions 18 of the slots 17, thereby forming means whereby said looped portions are prevented from becoming accidentally displaced from said hub 6.

It is preferred to construct the slot 17 with tapering walls as shown at 20 and to also construct the straight members 21 of the looped portions of the flat spring members 12, to conform substantially to the tapering walls 20.

It is preferred to construct the flat spring members 12 in such manner that after attachment thereof to the spoke carrying rim 9, they may be extended completely around the hub 6 and attached thereto at a point substantially diametrically opposite to said first mentioned attachment to the rim 9. It will be seen from such a construction, wherein each flat spring member 12 extends completely around the said hub, that a portion of each of said spring members 12 will be vertically beneath the hub 6 in whatever position the wheel may be, thus insuring the equal distribution of the strain among all of the spring members used in the support of the hub 6. It is believed that this construction is a substantial improvement over devices of this character heretofore used, especially in view of the fact that the weight placed upon the hub 6 is equally distributed and is not supported wholly by a few of the spring members.

As a further precaution against accidental displacement of the ends of the flat spring members 12 which are attached to the spoke carrying rim 9, a plurality of plates 22 are provided which are clamped to opposite sides of said spoke carrying rim 9 by means of suitable retaining bolts 23 which extend through said spoke carrying rim 9. The retaining bolts 23 extend through the aperture formed in the spoke carrying rim 9 by the curled portions 14 of the flat spring members 12. From this construction, it will be noted that the retaining bolts 23 not only clamp the wedge shaped portions 11 of the rim 9 securely together into a rigid continuous ring, but also, in view of the fact that they extend directly through the curled portions 14 of the flat spring members 12, act as a positive connection of said spring members to said rim 9.

Figure 2:
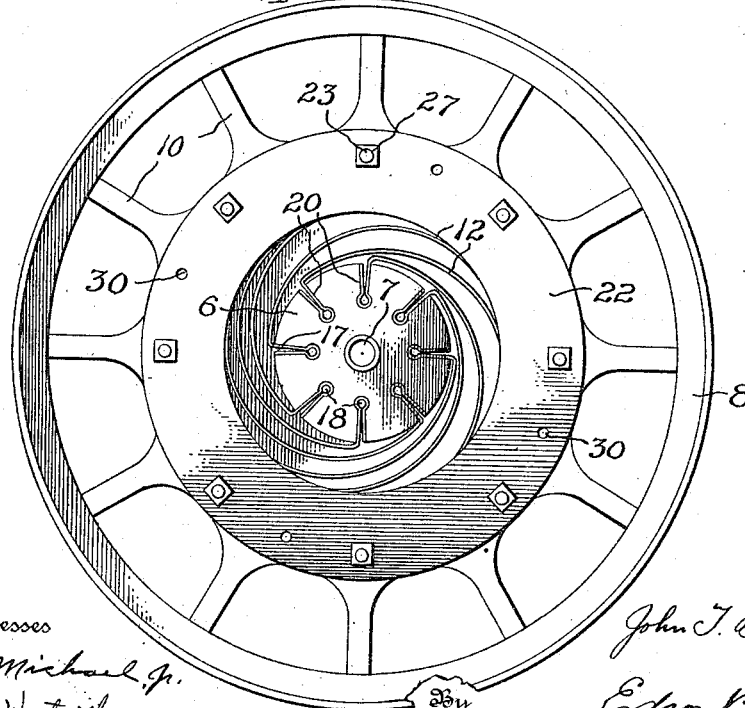
Fig. 2 is a front elevation showing a wheel with one of the retaining plates removed.

As will be noted from Fig. 2 of the drawings, the plates 22 extend a short distance beyond the inner periphery of the rim 9 and thus serve as means for retaining the flat spring members 12 directly interposed between the hub 6 and said rim 9.

As a further means of assuring a permanent connection of the inner ends of the flat spring members 12 to the hub 6, retaining plates 24 are provided and adapted for attachment to the opposite sides of said hub 6 by means of suitable retaining bolts 25. As shown, these retaining bolts 25 are extended through the enlarged cylindrical portions 16, of the loops formed at the inner ends of said spring members 12, in their passage through the said hub 6. This means of attachment of the plates 24 to the hub 6 serves the double function of preventing the loops embedded in the hub 6 from becoming displaced either horizontally or laterally.

This is also true of the plates 22 which are bolted to the rim 9, said bolts extending through the curled portions 14 of the spring members 12, as heretofore pointed out.

From the drawings, it will be noted that the outer periphery of the plates 24 lies flush with the outer periphery of the plates 22, but that said plates 24 are in no way connected to said plates 22, but on the other hand are adapted to move in all directions relative to one another.

In view of this fact, suitable cut out portions 26 are positioned around the outer periphery of the plates 24 in order to provide a suitable space within which are positioned bolt-heads 27 on opposite ends of the retaining bolts 23. This construction enables the plates 24, which are permanently attached to and move with the hub 6, to have a certain amount of play with relation to the afore mentioned bolt-heads 27.

It will readily be seen that the formation of the cut out portions 26 is a necessary expedient in order to permit of the relative movements of the plates 24, which, as above stated, are permanently attached to the hub 6, and therefore, are movable therewith, and the plates 22 which are permanently attached to the spoke carrying rim 9, and therefore, stationary. The extent to which the outer periphery of the plate 24 is cut out will regulate or predetermine the movements of the hub 6 with relation to the other elements of the wheel.

From the construction pointed out and clearly illustrated in Fig. 1 of the drawings, it will be readily seen that as soon as the hub 6 is depressed beyond a certain limit, the inner portions 26$^a$ of the cut out portions 26 will bind against the bolt-heads 27 of the retaining bolts 23, thus preventing any further depression of the spring members 12.

This will prevent the spring members 12 from being jammed, strained or broken.

It has been found in actual practice that when the axle or other member is rotated within the centrally disposed aperture 7 of the hub 6, there is a tendency of the said hub to rotate relative to the fixed elements of the wheel. Any such rotation of the hub may be limited to any desired extent by forming the cut out portions 26 of greater or lesser width, thereby permitting the side walls 29 of said cut out portions 26 coming into contact with the bolt-heads 27 of the retaining bolts 23.

The purpose of tapering the slots 17 from the outer periphery of the hub 6 toward the enlarged portions 18 of said slots, is to permit of the straight walls 21 of the looped portions 16 of the spring member 12 being so formed as to bind against the walls of said tapered slots and to thereby form means which will substantially increase the resiliency of said spring members when the wheel is moved in a reverse direction. The increased resiliency is produced by the free end of the looped portions of the flat spring members 12 binding against the corresponding tapered wall of the slots 17.

In order to provide for the use of the wheel in the event the spokes are broken or otherwise become incapable of performing their functions, suitable retaining bolts or other members are passed through suitable apertures 30 which extend through the plates 24, the plates 22 and the spoke carrying rim 9. This will retain the hub in a rigid position with respect to the other elements of the wheel and will also keep the same in concentric relation to the spoke carrying rim 9 and the outer periphery 8. This will permit of the wheel being used in cases of emergency, where the springs have become broken or otherwise disabled.

Having thus described my invention, what I claim as new and desire to secure by Letters Patent of the United States is:—

1. A wheel of the class described comprising a hub, a spoke carrying rim and a felly, said spoke carrying rim being composed of a plurality of abutting wedge shaped sections, a plurality of flat spring members being interposed between said hub and said spoke carrying rim, the outer ends of alternate spring members being clamped between the abutting edges of said wedge shaped sections of the spoke carrying rim and means for preventing their accidental displacement therefrom.

2. A wheel of the class described comprising a hub, a spoke carrying rim and a felly, said spoke carrying rim being composed of a plurality of wedge shaped sections, a plurality of flat spring members being interposed between said hub and said spoke carrying rim, the outer ends of said flat spring members having enlarged heads some of which are adapted to be clamped between the abutting edges of said wedge shaped sections of the spoke carrying rim, while the others are adapted to be embedded within said rim intermediate said abutting edges.

3. A device of the class described comprising a hub, a rim coöperating therewith, and a plurality of flat spring members interposed between the hub and rim, the inner ends of said flat spring members being embedded in slots formed in the hub and provided with means for increasing the resiliency of said flat spring members when the device is rotated in a reverse direction, said means comprising loops formed in the ends of the spring members, the walls of which are adapted to engage the walls of said slots and to be moved toward one another when the device is rotated in a reverse direction.

4. A wheel of the class described, comprising a hub and a felly provided with a plurality of spokes terminating in wedge-shaped sections integral therewith, adapted to abut one against the other, thereby forming a continuous rim surrounding said hub, a plurality of spring members interposed between said rim and said hub, adapted to resiliently support the latter, the outer ends of alternate spring members being rigidly clamped between said abutting wedge-shaped sections, while the inner ends thereof terminate in substantially V-shaped loops which are loosely embedded in suitable slots formed in the said hub, in such manner as to permit of the said V-shaped loops contracting when the spring members are placed under compression.

In testimony whereof, I affix my signature, in presence of two witnesses.

JOHN T. BREEN.

Witnesses:
C. N. McIlvaine,
H. B. Yeager.

Copies of this patent may be obtained for five cents each, by addressing the "Commissioner of Patents, Washington, D. C."